(12) United States Patent
Lee et al.

(10) Patent No.: US 9,981,683 B2
(45) Date of Patent: May 29, 2018

(54) DEVICE FOR CONTROLLING RESTORATION OF MDPS SYSTEM

(71) Applicant: Hyundai Motor Company, Seoul (KR)

(72) Inventors: Jong Ho Lee, Incheon (KR); Wooje Sung, Yongin-si (KR); Min Woo Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 266 days.

(21) Appl. No.: 14/885,122

(22) Filed: Oct. 16, 2015

(65) Prior Publication Data

US 2016/0318546 A1 Nov. 3, 2016

(30) Foreign Application Priority Data

Apr. 28, 2015 (KR) .................... 10-2015-0059923

(51) Int. Cl.
*B62D 5/04* (2006.01)
*B62D 6/00* (2006.01)

(52) U.S. Cl.
CPC .......... *B62D 5/0466* (2013.01); *B62D 5/046* (2013.01); *B62D 5/0463* (2013.01); *B62D 5/0472* (2013.01); *B62D 5/0481* (2013.01); *B62D 6/008* (2013.01)

(58) Field of Classification Search
CPC .... B62D 5/0466; B62D 5/0457; B62D 5/046; B62D 5/0463; B62D 5/0472; B62D 6/008; B62D 5/0481
See application file for complete search history.

(56) References Cited

U.S. PATENT DOCUMENTS

| | | | | |
|---|---|---|---|---|
| 5,525,877 A | * | 6/1996 | Umida | H02P 23/16 318/432 |
| 6,131,693 A | * | 10/2000 | Mukai | B62D 5/0463 180/443 |
| 6,450,287 B1 | * | 9/2002 | Kurishige | B62D 5/0466 180/443 |
| 7,242,161 B2 | * | 7/2007 | Okamoto | B62D 5/0448 180/446 |
| 9,682,722 B2 | * | 6/2017 | Tamaizumi | B62D 5/0463 |
| 9,771,097 B2 | * | 9/2017 | Kitazume | B62D 5/0466 |
| 2002/0097992 A1 | * | 7/2002 | Satta | H02P 1/00 388/800 |

(Continued)

FOREIGN PATENT DOCUMENTS

JP 2004-345596 A 12/2004
KR 10-2006-0121511 A 11/2006

(Continued)

*Primary Examiner* — Thomas G Black
*Assistant Examiner* — Sze-Hon Kong
(74) *Attorney, Agent, or Firm* — Morgan, Lewis & Bockius LLP

(57) ABSTRACT

A device for controlling restoration of a motor driven power steering (MDPS) system may include a controller configured to control an MDPS system model to output a target steering column speed command corresponding to a restoration control torque command based on a received error between a target steering column speed and an actual steering column speed, and a disturbance observer configured to compensate for a disturbance included in an output of the MDPS system model to provide the disturbance to an output of the controller, in which the output of the MDPS system model may be fed back to an input of the controller.

8 Claims, 8 Drawing Sheets

(56) References Cited

U.S. PATENT DOCUMENTS

| | | | | |
|---|---|---|---|---|
| 2002/0190683 A1* | 12/2002 | Karikomi | G01M 3/005 | |
| | | | 318/568.11 | |
| 2007/0029129 A1* | 2/2007 | Shiozawa | B62D 6/04 | |
| | | | 180/446 | |
| 2007/0144815 A1* | 6/2007 | Tsutsumi | B62D 5/003 | |
| | | | 180/402 | |
| 2009/0192679 A1* | 7/2009 | Kobayashi | B62D 5/0463 | |
| | | | 701/42 | |
| 2010/0286870 A1* | 11/2010 | Endo | H02P 6/10 | |
| | | | 701/41 | |
| 2016/0001814 A1* | 1/2016 | Endo | B62D 5/0466 | |
| | | | 701/41 | |
| 2016/0059885 A1* | 3/2016 | Tsubaki | B62D 5/0472 | |
| | | | 701/42 | |
| 2016/0159390 A1* | 6/2016 | Tamaizumi | B62D 5/0463 | |
| | | | 701/41 | |
| 2017/0120948 A1* | 5/2017 | Kitazume | B62D 5/0466 | |
| 2017/0137057 A1* | 5/2017 | Kitazume | B62D 5/0466 | |
| 2017/0166243 A1* | 6/2017 | Sugawara | B62D 5/0463 | |
| 2017/0183028 A1* | 6/2017 | Kitazume | B62D 6/00 | |
| 2017/0217479 A1* | 8/2017 | Tsubaki | B62D 5/0463 | |
| | | | 180/446 | |
| 2017/0232997 A1* | 8/2017 | Tsubaki | B62D 5/0463 | |
| 2018/0022377 A1* | 1/2018 | Tsubaki | B62D 5/0466 | |

FOREIGN PATENT DOCUMENTS

| | | |
|---|---|---|
| KR | 10-2014-0036904 A | 3/2014 |
| KR | 10-2015-0002370 A | 1/2015 |
| KR | 10-2015-0024727 A | 3/2015 |

* cited by examiner

DEVICE FOR CONTROLLING RESTORATION OF MDPS SYSTEM

CROSS-REFERENCE TO RELATED APPLICATION

The present application claims priority to Korean Patent Application No. 10-2015-0059923 filed Apr. 28, 2015, the entire contents of which is incorporated herein for all purposes by this reference.

BACKGROUND OF THE INVENTION

Field of the Invention

The present invention relates to a motor driven power steering (MDPS) technique, and more particularly, to a device for controlling restoration of an MDPS system.

Description of Related Art

A motor driven power steering (MDPS) system is an apparatus which facilitates steering by using an auxiliary power source to provide part of steering torque which a driver applies to a handle during vehicle steering. In other words, the MDPS system may receive a signal which monitors the driver's intention to steer a steering wheel through a torque sensor directly connected to the steering wheel, and assists a steering force by driving a motor to provide an adequate force based on current speed of a vehicle, etc.

Therefore, when the driver parks, stops, or drives the vehicle slowly, the MDPS system may generate a large force to assist the driver. When the driver drives the vehicle fast, the MDPS system may assist only a small force to maintain stability of the vehicle.

To provide power, the MDPS system is a steering apparatus which uses an electric motor instead of a conventional hydraulic steering apparatus that operates by oil pressure. The MDPS system provides an optimal steering force according to speed of the vehicle to provide eco-friendly effects and reduce fuel consumption.

The MDPS system assists driving of the driver by including a damping logic for improving vehicle yaw stability and restoration logic for improving steering restoration of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for controlling restoration of a motor driven power steering (MDPS) system in a vehicle which is capable of improving restoration performance of the vehicle that is a chronic problem of the MDPS system and executing feedback control regarding restoration control to eliminate dissatisfaction of a driver of the vehicle according to the problem.

According to various aspects of the present invention, a device for controlling restoration of a motor driven power steering (MDPS) system may include a controller configured to control an MDPS system model to output a target steering column speed command corresponding to a restoration control torque command based on a received error between a target steering column speed and an actual steering column speed, and a disturbance observer configured to compensate for a disturbance included in an output of the MDPS system model to provide the compensated disturbance to an output of the controller, in which the output of the MDPS system model may be fed back to an input of the controller.

The device may further include a filter configured to filter the output of the MDPS system model and feed the filtered output back to the input of the controller, in which the disturbance observer compensates for a disturbance included in an output signal of the filter to provide the compensated disturbance included in the output signal to the output of the controller.

The device may further include a target column speed generator configured to generate the target steering column speed based on a steering angle and a vehicle speed.

The disturbance observer may include an inverse model device which includes an input that is the output of the MDPS system model and a transfer function that is a product of a transfer function of a Q filter for suppressing the disturbance of the MDPS system model and an inverse of a transfer function of the MDPS system model, a gain device configured to multiply an output of the inverse model device by a gain for suppressing a divergence of the MDPS system model, and a subtractor configured to feed a value obtained by subtracting a product of the output of the controller and the transfer function of the Q filter from an output value of the gain device back to the output of the controller.

The Q filter may include a first order low-pass filter.

The controller may include a lead-lag controller.

The lead-lag controller may include a first order transfer function.

The filter may include a first order low-pass filter.

The MDPS system model may include a first order transfer function.

When the device for controlling restoration of the MDPS system according to the various embodiments of the present invention is applied to a real car test, the embodiment of the present invention may improve follow-up performance of target steering angular speed.

Various embodiments of the present invention may improve restoration performance or restoration speed of the vehicle (or a steering wheel), and may remove a remaining angle and multi-stage phenomena of the steering wheel.

In addition, various embodiments of the present invention may improve the restoration performance of the vehicle without an additional cost, and thus may remove dissatisfaction of the driver.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Restoration control regarding a motor driven power steering (MDPS) system compared with the present invention is open loop control and outputs a current corresponding to torque that restores a vehicle and a steering wheel to a motor according to a vehicle speed and a steering angle. The control is a simple and intuitive implementation, but may have a disadvantage that the steering wheel is not restored to center or neutrality of the steering wheel because of a disturbance such as hardware friction of the MDPS system or a road surface condition.

Figure 1:
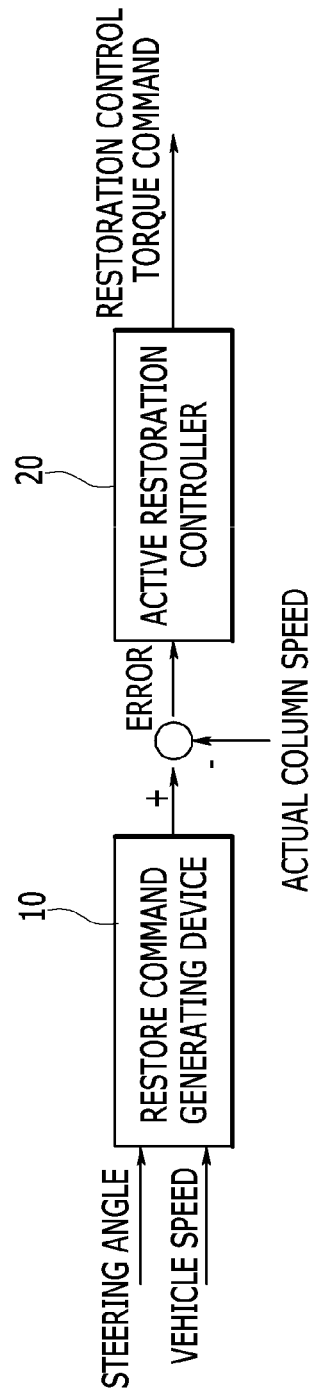
FIG. 1 is a view showing an example of a feedback restoration logic apparatus by a motor driven power steering (MDPS) system.

FIG. 1 is a view showing an example of a feedback restoration logic apparatus by a motor driven power steering (MDPS) system.

The apparatus of FIG. 1 may improve restoration and high-speed damping performance by using speed control over a steering column of the MDPS system. The apparatus may improve a multi-stage phenomenon of a steering wheel and minimize heterogeneity of restoration control.

The apparatus shown in FIG. 1 may include a target load determination device 10 determining a target load or a target column speed based on a steering angle, and a controller 20 which receives an error between the target load and an estimated actual load (an estimated actual column speed) and may feed an output value of the controller 20 back to an input of the controller 20 and may control (or remove) the error. The target load determination device 10 may also be referred to as a restore command generating device. The actual column speed may be estimated on the basis of a column torque and an output current of the MDPS system. A target column speed command output from the controller 20 may be converted to a restoration control torque command which is input to a motor of the MDPS system in accordance with a relationship between the column torque and a column speed.

Control logic of the apparatus of FIG. 1 is explained as follows.

The target load determination device 10 may generate a restoration angular command based on the steering angle.

The apparatus of FIG. 1 may calculate restoration control torque through feedback control and determine the driver's will by using decouple control.

The controller 20 may perform angular speed control of a column through the feedback control and use a proportional integral differential (PID) controller that is a feedback controller.

In the controller 20, tuning of a gain value may be required according to a vehicle including the apparatus of FIG. 1, and target follow-up performance may be insufficient depending on the gain value or difficulty of the tuning may be present because of an overshoot occurrence.

Figure 2:
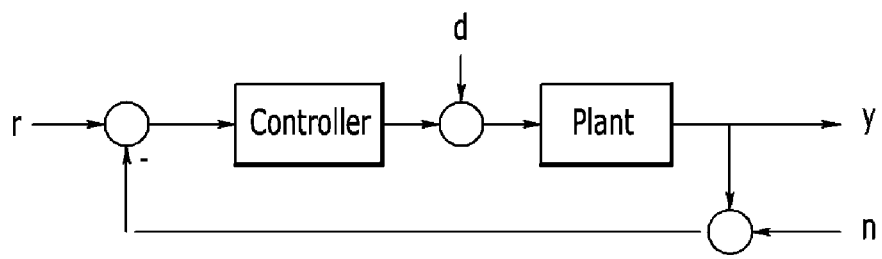
FIG. 2 is a view for explaining an exemplary device for controlling restoration of a motor driven power steering (MDPS) system according to the present invention.

FIG. 2 is a view for explaining a device for controlling restoration of a motor driven power steering (MDPS) system according to various embodiments of the present invention.

In the device of FIG. 2, an output (y) may follow a reference (r) well. The device of FIG. 2 may not be affected by a disturbance (d) and a noise (n), and may be a control device which may follow the reference (r) robustly despite an error of a plant model that is a control object model. The plant model may be a motor driven power steering (MDPS) system model.

In the device according to the present invention shown in FIG. 2, a controller that may be a lead-lag controller may be designed based on a model to secure basic performance. Influence of the disturbance may be reduced by a disturbance observer (DOB). Influence of the noise may, for example, be reduced by a low-pass filter.

Figure 3:
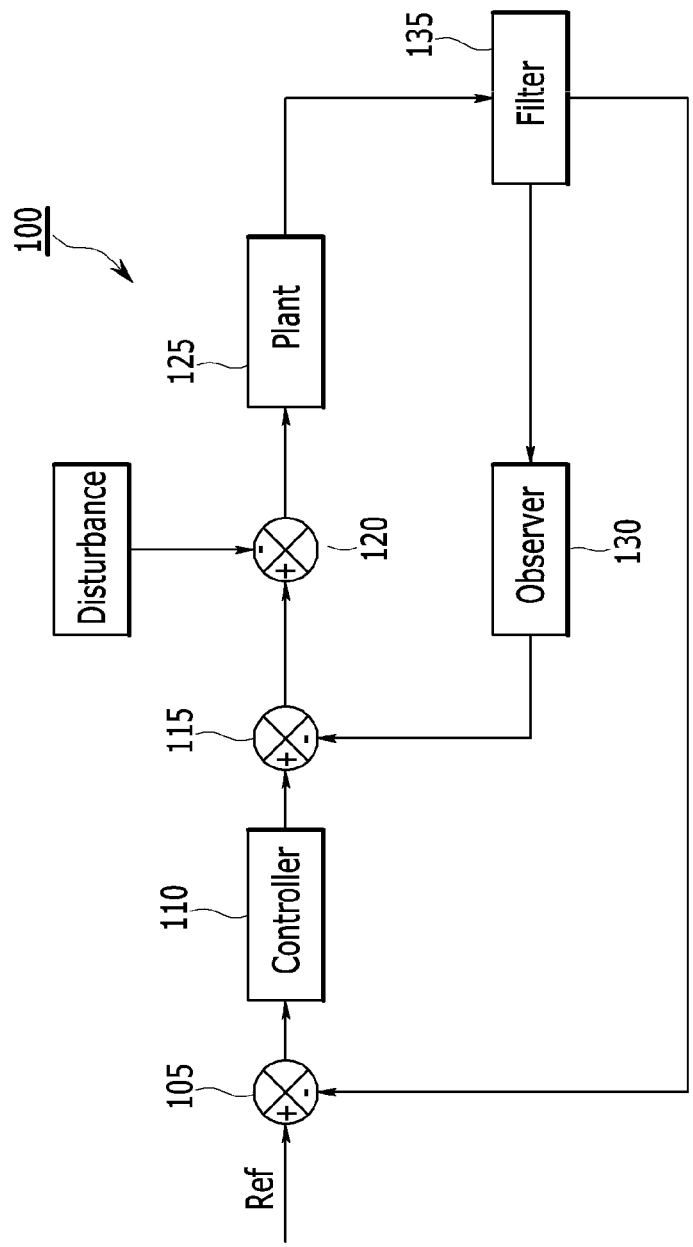
FIG. 3 is a view for explaining the exemplary device for controlling restoration of the MDPS system shown in FIG. 2 in more detail.

FIG. 3 is a view for explaining the device for controlling restoration of the MDPS system shown in FIG. 2 in more detail.

Referring to FIG. 3, a device for controlling restoration of the MDPS system 100 includes a controller 110, a motor driven power steering (MDPS) system model 125, a filter 135, and a disturbance observer 130.

The controller 110 may control the MDPS system model 125 that models the MDPS system to output a target steering column speed command (or a target column speed command) corresponding to a restoration control torque command based on a received error (Ref) or a received error signal between a target steering column speed (or target angular velocity of a steering column) and an actual steering column speed (or actual angular velocity of the steering column) The received error (Ref) may be input through a subtractor 105. The controller 110 may control the MDPS system model 125 to remove the error (Ref). The target steering column speed command may be converted to the restoration control torque command input to a motor of the MDPS system (or the MDPS device) according to a relationship between a column torque and a column speed.

The actual steering column speed may represent an output value of the MDPS system (the MDPS system model) corresponding to rotation speed of the steering column which is included in a vehicle and rotated by the motor. The motor may be controlled by an electronic control device (ECU) of the MDPS system. In various embodiments of the present invention, the actual speed of the steering column may be estimated based on a steering column torque measured by a torque sensor and an output current of the MDPS system. The restoration control torque command may be added in a control signal output from the ECU that is included in the MDPS system. The MDPS system may support or assist a steering torque of a steering wheel (or a handle) and a restoration torque for moving to a neutral or center position of the steering wheel. The control signal may be a signal that controls the steering wheel to be restored to the center position of the steering wheel and may be output to the motor such as an electric motor that provides the restoration torque to the steering wheel. A plant 125 may be a control object and may be the MDPS system model.

The MDPS system may include the torque sensor that measures the steering torque of a driver input to the steering wheel, a steering angle sensor that measures a steering angle of the steering wheel, and a vehicle speed sensor that measures speed of the vehicle. The MDPS system may include the motor, a steering gear box, the torque sensor, and the ECU. The ECU may control torque of the steering wheel by detecting a rotation amount of the steering wheel with the torque sensor and applying a current to the motor according to speed of the vehicle.

The filter 135 may filter an output (or an output signal) of the MDPS system model 125 and feed the filtered output back to an input of the controller 110 through the subtractor 105.

The disturbance observer 130 may compensate for or remove a disturbance included in an output signal of the filter 135 and provide the output signal in which the disturbance is removed to an output (or an output signal) of the controller 110 or an input of the MDPS system model 125 through a subtractor 115. The disturbance such as friction between parts or components of the MDPS system may be provided to the MDPS system model 125 via a subtractor 120.

According to various embodiments of the present invention, the filter 135 may be omitted in the device for controlling restoration of the MDPS system 100. When the filter 135 is omitted, the disturbance observer 130 may compensate for a disturbance included in the output of the MDPS system model 125 to provide it to the output of the controller 110, and the output of the MDPS system model 125 may be fed back to the input of the controller 110.

Figure 4:
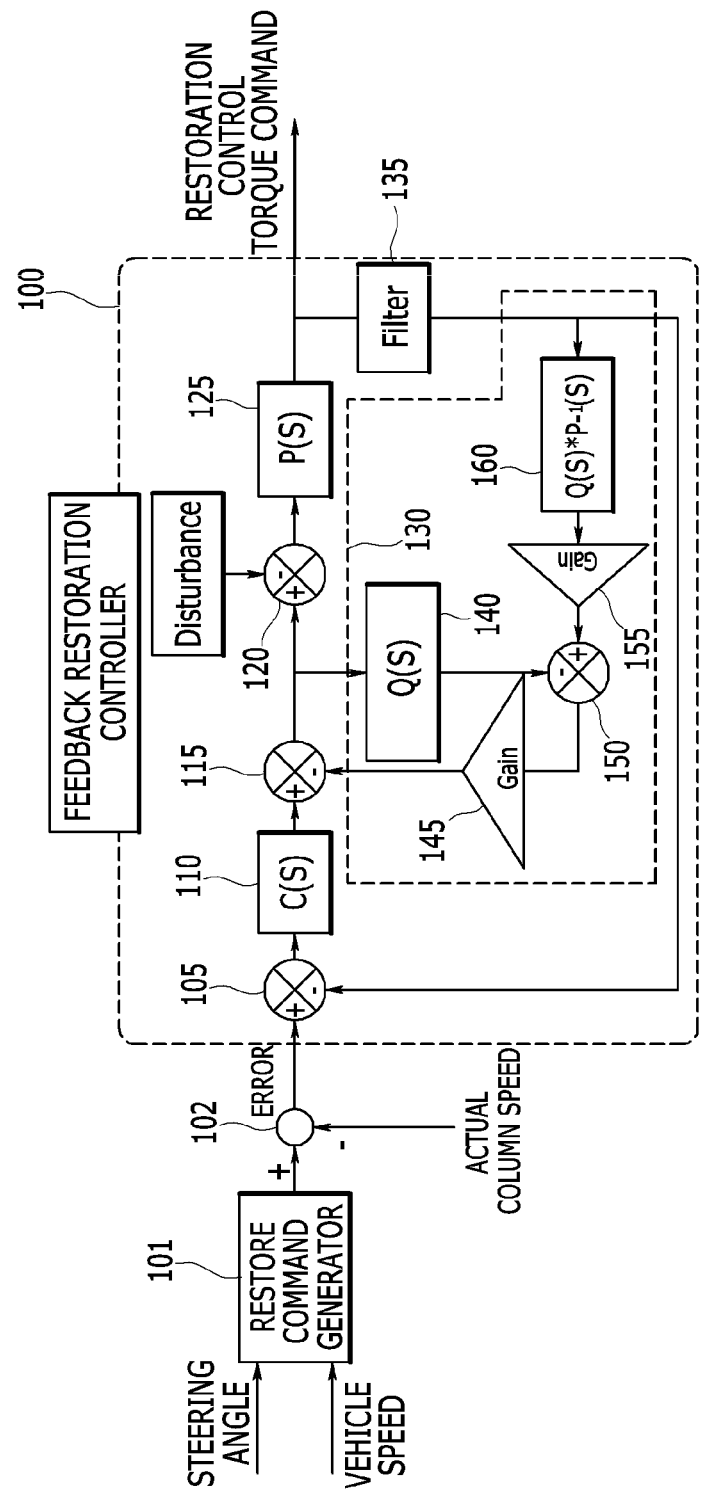
FIG. 4 is a view for describing the exemplary device for controlling restoration of the MDPS system shown in FIG. 3 in more detail.

FIG. 4 is a view for describing the device for controlling restoration of the MDPS system shown in FIG. 3 in more detail.

Referring to FIG. 4, the device for controlling restoration of the MDPS system 100 may be a feedback control system (or a feedback restoration controller) that receives the error between a target column speed and an actual column speed and uses the controller 110 that may be the lead-lag controller, the disturbance observer 130, and the filter 135. The device 100 may calculate (or output) the restoration control torque command to provide the motor of the MDPS system. The device 100 may also be referred to as an MDPS feedback restoration logic control system of the vehicle. A column (or the steering column) may indicate a middle portion of a handle shaft.

The device 100 may ensure follow-up performance by control based on a system model and may perform robust control over the disturbance through design of the disturbance observer 130. The device 100 may reduce tuning variables to simplify control of the MDPS system.

A target column speed generator 101 may generate (or calculate) the target steering column speed to provide it to a subtractor 102 based on the steering angle (or the steering angle by the driver) and the speed of the vehicle. The target column speed generator 101 may be included in the device 100 and may also be referred to as a restore command generator. The subtractor 102 may subtract the actual steering column speed from the target steering column speed to provide the result to the controller 110. The target column speed generator 101 may include a storage device (for example, an electrically erasable programmable read-only memory (EEPROM)) that stores a lookup table including a column speed value according to the steering angle and a vehicle speed. The restoration control torque command that is the output of the MDPS system control model 125 may be added in a control signal output from the MDPS system or a signal input to the motor.

The controller 110 that is denoted by C(s) in FIG. 4 may control the MDPS system model 125 to ensure basic control performance.

The filter 135, which is, for example, a first-order low-pass filter, may reduce sensitivity of the disturbance observer 130 and may be used to remove a noise.

The disturbance observer 130 may reduce effect of the disturbance and may be an observer for robust control of the device 100.

A design method of the controller 110 shown in FIG. 4 is described as follows.

$$C(s) = K_{gain}\frac{(s+b_1)(s+b_2)}{(s+a_1)(s+a_2)} \quad \text{[Equation 1]}$$
$$= K_{gain}\frac{s^2 + (b_1+b_2)s + b_1 b_2}{s^2 + (a_1+a_2)s + a_1 a_2}$$

$$C(s) \approx K_{gain}\frac{s^2 + (b_1+b_2)s + b_1 b_2}{s^2 + (a_1+a_2)s + a_1 a_2}$$
$$= K_{gain}\frac{(b_1+b_2)s + b_1 b_2}{(a_1+a_2)s + a_1 a_2}$$

In Equation 1, the Kgain may represent a gain of the lead-lag controller, the a1 and the b1 may represent a lead compensation gain, and the a2 and the b2 may represent a lag compensation gain.

A feedback restoration may not require a fast response, and a response of the feedback restoration may be slow. Therefore, in Equation 1, influence of a second order term is weaker than that of a first order term or that of a constant term. Therefore, in Equation 1, the second order term may be removed. Through an approximation method described above, a first order lead-lag controller or a transfer function of the first order lead-lag controller may be designed.

A design method of the disturbance observer 130 shown in FIG. 4 is explained below.

The disturbance observer 130 may estimate the disturbance by using an inverse model ($P^{-1}(s)$ in FIG. 4) of the MDPS system model (P(s) in FIG. 4). The disturbance observer 130 may remove the disturbance by feeding the estimated inverse model back to the output of the controller 110.

When a disturbance observer is actually applied to an MDPS system, the MDPS system that is a plant may not be modeled accurately. An inverse model of the plant may not be implemented due to a causality problem, and there may be an error between the plant and a modeled plant that models the plant. In addition, performance of the disturbance observer may be deteriorated due to a noise in a measurement signal of the MDPS system.

To solve this problem, a Q filter (Q(S)) (for example, a low-pass filter) shown in FIG. 4 is included in the MDPS system so that the inverse model of the plant may be realized. The Q filter (Q(S)) may be a factor influencing robustness of the MDPS system (or the MDPS system model) and disturbance suppression performance of the MDPS system. The disturbance observer 130 may regard an error between an actual plant and the modeled plant as the disturbance to compensate for the disturbance. The disturbance observer 130 may have a simple structure and a small amount of calculation, and thus may have a high utilization range.

To find an inverse of a transfer function (P(s)) used in the disturbance observer 130, a third order model (plant P(s)) of the MDPS system may be approximated by a first order equation as represented by Equation 2 below.

$$P(s) = \frac{\dot{\theta}_2(s)}{\tau_a(s)}$$ [Equation 2]

$$= \frac{J_1 s^2 + C_1 s + K}{J_1 J_2 s^3 + (J_1 C_2 + J_2 C_1)s^2 + (C_1 C_2 + J_2 K + J_1 K)s + (C_1 K + C_2 K)}$$

$$= \frac{1}{J_2} \frac{(s+n_1)(s+n_2)}{(s+d_1)(s+d_2)(s+d_3)}$$

$$\approx \frac{1}{J_2} \frac{n_1 n_2}{d_1 d_2} \frac{1}{(s+d_3)}$$

$$= \frac{1}{K'(s+d_3)}$$

$$= \frac{\alpha g}{s+\alpha}$$

Figure 5:
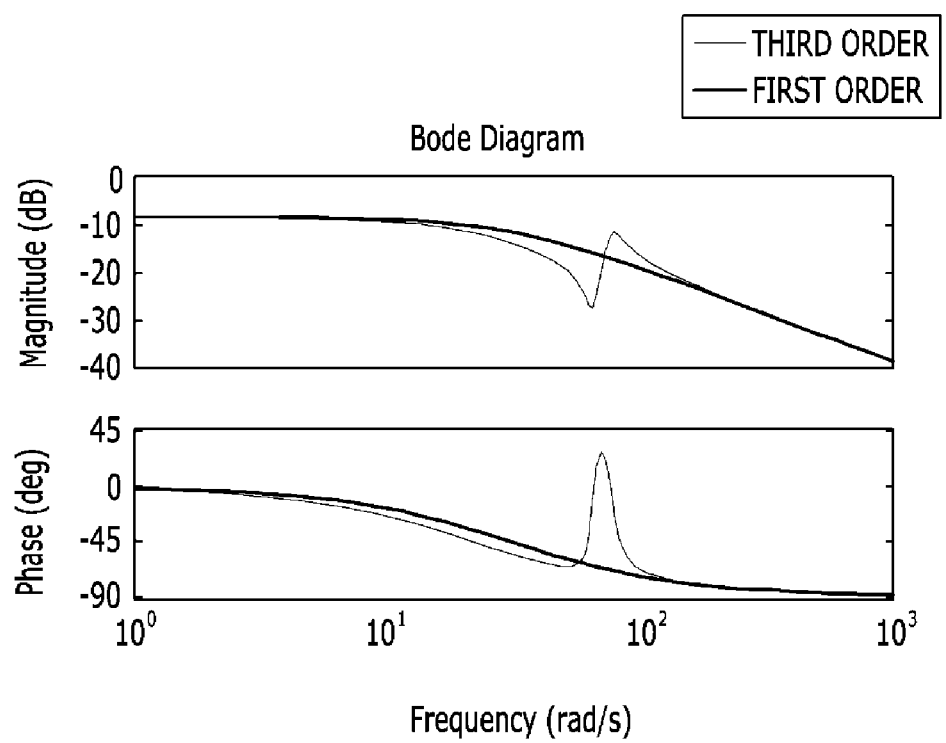
FIG. 5 is a graph for describing verification through a loop shaping method of a simplified model of the MDPS system shown in the FIG. 4.

As shown in FIG. 5, Equation 2 may be verified by a loop shaping method.

A process that obtains the $$\frac{\dot{\theta}_2(s)}{\tau_a(s)}$$

of Equation 2 is described as follows.

Figure 6:
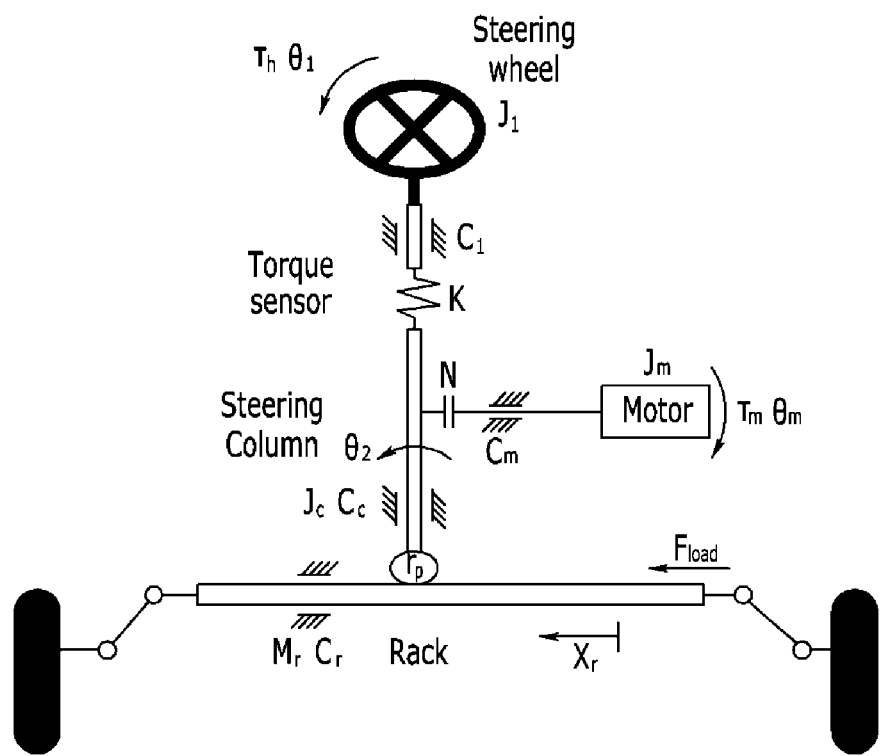
FIG. 6 is a view for describing a transfer function of the MDPS system model shown in FIG. 4.

With reference to FIG. 6, the $$\frac{\dot{\theta}_2(s)}{\tau_a(s)}$$

that is a transfer function of the MDPS system model 125 and is used for disturbance observation is calculated as follows. FIG. 6 is a view illustrating a steering device model including the MDPS system.

A differential equation (or a dynamic model) associated with the handle (or the steering wheel) is given by the following equation.

$$J_1\ddot{\theta}_1 + C_1\dot{\theta}_1 + K(\theta_1 - \theta_2) = \tau_h$$

The $\theta_1$ may be a steering angle of the handle, the $\theta_2$ may be a rotation angle of the steering column, the $J_1$ may indicate rotational moment of inertia of the handle, the $C_1$ may indicate a viscous damping coefficient of the handle, the K may indicate a spring constant (or a stiffness), and the $\tau_h$ may indicate a torque applied to the handle by the driver.

A differential equation related to the column, the motor, and a rack is given by the following equation. The column may also be referred to as the steering column or the steering shaft.

$$J_2\ddot{\theta}_1 + C_2\dot{\theta}_2 + K(\theta_2 - \theta_1) = N\tau_m - rF_{tire}$$

The $J_2$ (Jc in FIG. 6) may indicate a rotational moment of inertia of the steering column, the $C_2$ (Cc in FIG. 6) may indicate a viscous damping coefficient of the steering column, the K may indicate the spring constant (or the stiffness), the N may indicate a gear ratio of a gear (for example, a worm gear) connected to the motor of the MDPS system, the $\tau_m$ may indicate a torque of the motor, the r may indicate a gear ratio between the rack and a pinion ($r_p$), and the $F_{tire}$ ($F_{load}$ in FIG. 6) may indicate a force that comes from a tire of the vehicle and is applied to the rack.

Laplace transforms of the differential equations that are related to the handle, the column, the motor, and the rack are as follows.

$$(J_1 s^2 + C_1 s + K)\theta_1 = K\theta_2 + \tau_h$$

$$(J_2 s^2 + C_2 s + K)\theta_2 = K\theta_1 + \tau_a - d_r$$

When equations ($\tau_a = N\tau_m$, $d_r = rF_{tire}$) are substituted in the Laplace transform equation and the $\theta_1$ is cleared in the Laplace transform equations, the Laplace transform equations may be converted to the following equation.

$$(J_1 s^2 + C_1 s + K)(J_2 s^2 + C_2 s + K)\theta_2 = K^2\theta_2 + K\tau_h + (J_1 s^2 + C_1 s + K)(\tau_a - d_r)$$

If equations ($\tau_h = 0$ and $d_r = 0$) are substituted in the Laplace transform equation, $$\frac{\theta_2}{\tau_a}$$

is obtained as follows.

$$\frac{\theta_2}{\tau_a} = \frac{(J_1 s^2 + C_1 s + K)}{(J_1 s^2 + C_1 s + K)(J_2 s^2 + C_2 s + K) - K^2}$$

$$= \frac{J_1 s^2 + C_1 s + K}{J_1 J_2 s^4 + (J_1 C_2 + J_2 C_1)s^3 + (C_1 C_2 + J_2 K + J_1 K)s^2 + (C_1 K + C_2 K)s}$$

In the above equation, the $$\frac{\dot{\theta}_2}{\tau_a}$$

is obtained as follows.

$$\frac{\dot{\theta}_2}{\tau_a} = \frac{J_1 s^2 + C_1 s + K}{J_1 J_2 s^3 + (J_1 C_2 + J_2 C_1)s^2 + (C_1 C_2 + J_2 K + J_1 K)s + (C_1 K + C_2 K)}$$

A Q-filter 140 shown in FIG. 4 may be designed (modeled) as the following equation.

$$Q(s) = K_{DOB} \frac{w_c}{s + w_c}$$

The Wc in the equation may represent cut-off frequency.

In order to suppress divergence of the system due to modeling errors, a gain ($K_{DOB}$ or K_DOB) may be applied to a first order low pass filter (LPF) that is the embodiment of the Q-filter 140. The K_DOB may mean a tuning variable.

With reference to FIG. 4, the disturbance observer 130 is described in more detail as follows.

The disturbance observer 130 includes an inverse model device 160, a first gain device 155, a subtractor 150, and a second gain device 145.

The inverse model device 160 may include an input that is the output of the MDPS system model 125, and may include a transfer function that is a product of a transfer function of the Q filter 140 for suppressing (or compensating for) the disturbance of the MDPS system model 125 and an inverse of a transfer function of the MDPS system model 125.

The first gain device 155 may multiply an output of the inverse model device 160 by a first gain for suppressing a divergence of the MDPS system model 125.

The subtractor 150 may subtract a product of the output of the controller 110 and the transfer function of the Q filter 140 from an output value of the first gain device 155.

The second gain device 145 may feed a product of the output value of the subtractor 150 and a second gain (DOB_gain) for removing the disturbance back to the output of the controller 110.

In various embodiments of the present invention, the second gain device 145 may be removed in the disturbance observer 130. When the second gain device 145 is removed, the subtractor 150 may feed a value obtained by subtracting a product of the output of the controller 110 and the transfer function of the Q filter 140 from the output value of the gain device 155 back to the output of the controller 110.

The filter 135 (for example, a first-order low-pass filter (LPF)) shown in FIG. 4 may be designed as in the following equation.

$$G(s) = \frac{w_c}{s + w_c}$$

The Wc in the equation may represent cut-off frequency.

In order to lower sensitivity of the disturbance observer 130 and eliminate influence of the noise, a transfer function of the filter 135 may be applied to the device 100.

Figure 7A:
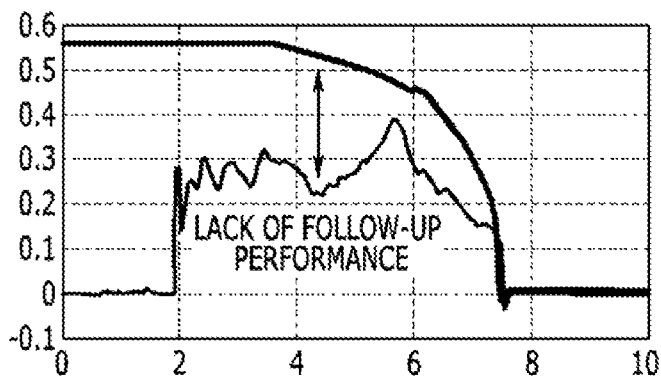
FIG. 7A and FIG. 7B are graphs for describing follow-up performance of a target steering angular speed according to the present invention.
Figure 7B:
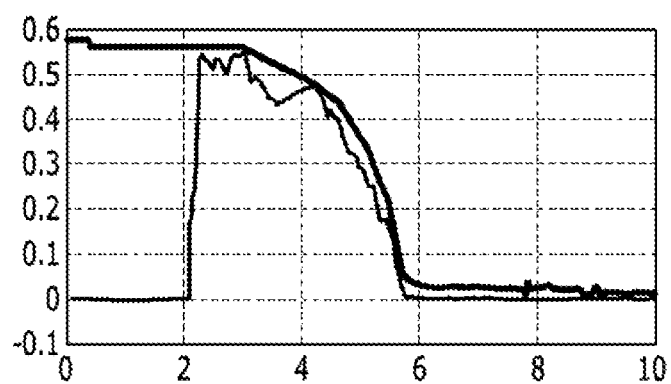

FIGS. 7A and 7B are graphs for describing follow-up performance of a target steering angular speed according to the present invention.

FIG. 7A may represent follow-up performance of a target steering angular speed of the apparatus that uses the PID controller and is shown in FIG. 1, and FIG. 7B may represent follow-up performance of the target steering angular speed for restoration according to the present invention.

Referring to FIGS. 7A and 7B, the present invention may control a real column speed (or the actual column speed) to follow the target column speed better than the apparatus using the PID controller of FIG. 1. Therefore, the present invention may have excellent responsiveness.

Figure 8A:
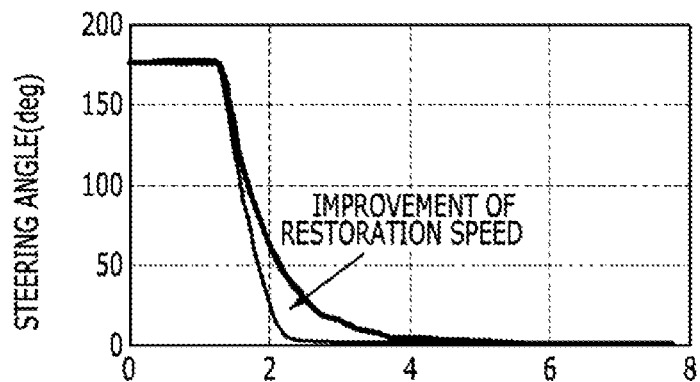
FIG. 8A and FIG. 8B are graphs for describing restoration performance of the vehicle according to the present invention.
Figure 8B:
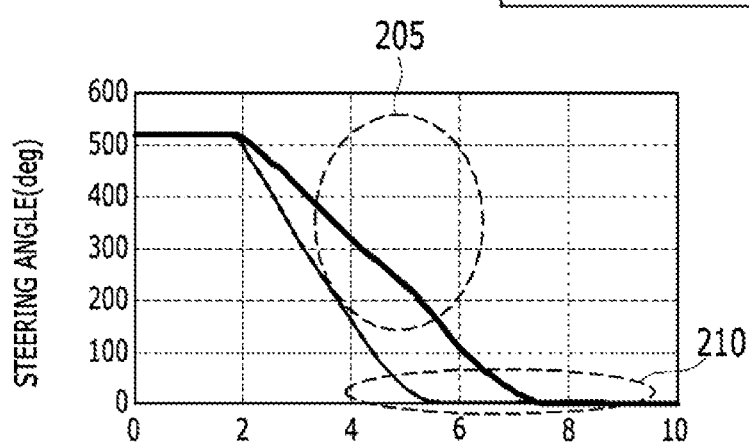

FIGS. 8A and 8B are graphs for describing restoration performance of the vehicle according to the present invention.

FIG. 8A is a graph for comparing restoration speed of the steering wheel according to the apparatus of FIG. 1 with restoration speed of the steering wheel according to the present invention.

Referring to FIG. 8A, it may be seen that when the vehicle speed is 24 kilometers per hour (KPH), the present invention may increase the restoration speed of the steering wheel more than the apparatus using the PID controller of FIG. 1.

FIG. 8B is a graph for comparing the restoration performance in creep driving according to the apparatus of FIG. 1 with the restoration performance in creep driving according to the present invention.

Referring to FIG. 8B, during the creep driving of the vehicle, the present invention may eliminate the remaining angle that may be generated during restoration of the steering wheel, as shown by reference numeral 210, and may eliminate a multi-stage phenomenon in which angular speed of restoration is not uniform, as shown by reference numeral 205.

As described above, the present invention may change restoration control of an open-loop control system to feedback control, and thus may enable the steering wheel to restore the center of the steering wheel in spite of the disturbance. Therefore, restoration performance of the vehicle may be improved and the driver's complaint may be removed.

The components, "~device", block, or module which are used in the present exemplary embodiment may be implemented in software such as a task, a class, a subroutine, a process, an object, an execution thread, or a program which is performed in a predetermined region on the memory, or hardware such as a field programmable gate array (FPGA) or an application-specific integrated circuit (ASIC), and may be performed in a combination of the software and the hardware. The components, '~part', or the like may be embedded in a computer-readable storage medium, and some part thereof may be dispersedly distributed in a plurality of computers.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for controlling restoration of a motor driven power steering (MDPS) system, the device comprising:
    a controller configured to control an MDPS system model to output a target steering column speed command corresponding to a restoration control torque command based on a received error between a target steering column speed and an actual steering column speed; and
    a disturbance observer configured to compensate for a disturbance included in an output of the MDPS system model to provide the compensated disturbance to an output of the controller, wherein the output of the MDPS system model is fed back to an input of the controller, and wherein the disturbance observer comprises:

an inverse model device which includes an input that is the output of the MDPS system model and a transfer function that is a product of a transfer function of a Q filter for suppressing the disturbance of the MDPS system model and an inverse of a transfer function of the MDPS system model;

a gain device configured to multiply an output of the inverse model device by a gain for suppressing a divergence of the MDPS system model; and a subtractor configured to feed a value obtained by subtracting a product of the output of the controller and the transfer function of the Q filter from an output value of the gain device back to the output of the controller.

2. The device of claim 1, further comprising a filter configured to filter the output of the MDPS system model and feed the filtered output back to the input of the controller, wherein the disturbance observer compensates for a disturbance included in an output signal of the filter to provide the compensated disturbance included in the output signal to the output of the controller.

3. The device of claim 2, further comprising a target column speed generator configured to generate the target steering column speed based on a steering angle and a vehicle speed.

4. The device of claim 1, wherein the Q filter comprises a first order low-pass filter.

5. The device of claim 1, wherein the controller comprises a lead-lag controller.

6. The device of claim 5, wherein the lead-lag controller includes a first order transfer function.

7. The device of claim 2, wherein the filter comprises a first order low-pass filter.

8. The device of claim 1, wherein the MDPS system model comprises a first order transfer function.

* * * * *